(12) United States Patent
Fan et al.

(10) Patent No.: US 12,021,955 B2
(45) Date of Patent: Jun. 25, 2024

(54) METHOD AND APPARATUS FOR PROCESSING DATA IN A NETWORK

(71) Applicant: Huawei Technologies Co., Ltd., Shenzhen (CN)

(72) Inventors: Shiqing Fan, Munich (DE); Guoli Wang, Munich (DE)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 148 days.

(21) Appl. No.: 17/588,789

(22) Filed: Jan. 31, 2022

(65) Prior Publication Data

US 2022/0166857 A1 May 26, 2022

Related U.S. Application Data (63) Continuation of application No. PCT/EP2019/071131, filed on Aug. 6, 2019.

(51) Int. Cl.
*H04L 69/22* (2022.01)
*H04L 49/9057* (2022.01)

(52) U.S. Cl.
CPC .......... *H04L 69/22* (2013.01); *H04L 49/9057* (2013.01)

(58) Field of Classification Search
None
See application file for complete search history.

(56) References Cited

U.S. PATENT DOCUMENTS

| | | | |
|---|---|---|---|
| 9,658,879 B2 | 5/2017 | Lv et al. | |
| 2004/0073946 A1 | 4/2004 | Kobayashi | |
| 2010/0220638 A1 | 9/2010 | Carmon et al. | |
| 2013/0262868 A1* | 10/2013 | Friedman | H04L 9/0618 713/171 |
| 2015/0178235 A1* | 6/2015 | Kanigicherla | H04L 41/0803 710/314 |
| 2019/0052582 A1 | 2/2019 | Gaal et al. | |
| 2019/0095236 A1 | 3/2019 | Felter et al. | |

FOREIGN PATENT DOCUMENTS

| | | | |
|---|---|---|---|
| CN | 1614955 A | * | 5/2005 |
| CN | 1614955 A | | 5/2005 |
| CN | 101158936 A | | 4/2008 |
| CN | 101859263 A | | 10/2010 |
| JP | H10301871 A | | 11/1998 |

OTHER PUBLICATIONS

Wang Pei-dong, et al., "Design and implementation of adaptive buffer for embedded protocol stack," Application Research of Computers, vol. 26, No. 6, Jun. 2009, with an English abstract, 4 pages.

* cited by examiner

*Primary Examiner* — Jenkey Van
(74) *Attorney, Agent, or Firm* — Conley Rose, P.C.

(57) ABSTRACT

A method comprises allocating a data buffer in a shared memory region of a computing device, writing communication data comprising a header portion and a body portion into the data buffer, generating a modified header portion by appending the header portion of the communication data with address data that determines an address of the communication data in the data buffer, processing the modified header portion through the network protocol stack, and storing the body portion in the data buffer in a compatible data format for communication according to the networking protocol stack.

20 Claims, 9 Drawing Sheets

METHOD AND APPARATUS FOR PROCESSING DATA IN A NETWORK

CROSS-REFERENCE TO RELATED APPLICATIONS

This is a continuation of International Patent Application No. PCT/EP2019/071131 filed on Aug. 6, 2019, which is hereby incorporated by reference in its entirety.

TECHNICAL FIELD

The present application relates to data operations in a network protocol stack. More particularly but not exclusively, it relates to storing data in a format suitable for communication in a network and performing data pass through in a network protocol stack.

BACKGROUND

Networked devices are used in a wide variety of contexts. Networked devices communicate across the network using a network protocol stack. Network protocol stacks are designed with many layers that involve a large number of data manipulation operations. The data manipulation operations include copying user data to communication buffers, serialization, deserialization, and network byte conversion and matching of the data structure between user application and the communication middleware.

In certain kinds of networked systems, the network latency can heavily impact the overall performance of the system. For example, in autonomous vehicle systems if an obstacle is detected in the path of the vehicle this information has to be conveyed to the onboard computers in the vehicle such that it can react quickly. In that case there may be a maximum tolerated latency at which the system can operate. As vehicles move towards full autonomy the desire for low latency communication in the system is increasing.

Applications running on a networked device interact with lower levels of the network protocol stack to communicate data with other processes on the device and other networked devices over the network. A performance bottleneck occurs in critical paths due to memory copy operations. Memory copy operations are operations which occur when data is moved into the communication queue from higher up the network protocol stack, or when data is moved into the transport layer. The number of memory copy operations that are performed can have a significant impact on the network latency.

SUMMARY

In a first aspect there is provided a method for processing data in a network protocol stack. The method comprises allocating a data buffer in a shared memory region of a computing device, writing communication data comprising header and body portions into the data buffer, generating a modified header portion by appending the header portion of the communication data with address data that determines an address of the communication data in the data buffer and processing the modified header portion through a network protocol stack. The body portion of the communication data is stored in the data buffer in a compatible data format for communication according to the networking protocol stack.

In an implementation of the first aspect, the method comprises parsing the modified header portion to determine the address data and accessing the body portion of the communication data on the basis of the address data of the modified header portion.

In a further implementation of the first aspect, the modified header portion comprises a flag bit identifying the header portion as a modified header portion.

In a further implementation of the first aspect, the method comprises storing the communication data in a compatible format comprises serialising and/or encrypting the communication data.

In a further implementation of the first aspect, processing the modified header portion through the network protocol stack comprises determining that the body portion of the communication data is decoupled from the header portion.

In a further implementation of the first aspect, the method comprises receiving communication data comprising a header portion and a body portion at a network interface and parsing the header portion to determine whether the communication data comprises a modified header portion.

In a further implementation, the method comprises processing the communication data through a network protocol stack, when the data is determined as containing an unmodified header portion.

In a further implementation the method comprises writing the communication data into a data buffer in a shared memory region when the communication data comprises a modified header portion.

In a further implementation of the first aspect the method comprises accessing the body portion of the communication data on the basis of the address data of the modified header portion.

In a further implementation of the first aspect the method comprises processing the body portion of the communication data for use in an application.

In a second aspect there is provided an apparatus comprising a shared memory region, a communication regulator module communicatively coupled to the shared memory region, configured to allocate a data buffer in the shared memory region and a data management module communicatively coupled to the communication regulator module configured to store data in the data buffer in a compatible data format for communication according through a networking protocol stack. The communication regulator module is configured to generate a header portion for communicating data, the header portion comprising address data that determines the location of the data in the data buffer.

In an implementation of the second aspect, the apparatus comprises an interface communicatively coupled to the communication regulator module and data management module, arranged to facilitate data communication with external applications.

In a further implementation of the second aspect, the apparatus comprises a protocol stack module communicatively coupled to the shared memory region, arranged to implement a network protocol stack.

In a further implementation of the second aspect the protocol stack is arranged to encrypt and/or serialize data in the shared memory region.

In a further implementation of the second aspect, the apparatus comprises a shared memory management module communicatively coupled to the shared memory region, arranged to manage data in the shared memory region.

In a third aspect, there is provided computer program comprising instructions which upon execution by one or more processors, cause the method of any implementation of the first aspect to be performed. The computer program may be stored on a data carrier or other computer-readable medium, for example. The computer readable carrier medium may be transitory or non-transitory.

In a fourth aspect there is provided a device comprising one or more processors and a memory configured to perform the method of any implementation of the first aspect mentioned above.

BRIEF DESCRIPTION OF THE DRAWINGS

Embodiments will now be described, by way of example only, with reference to the accompanying drawings, in which.

DETAILED DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 1:
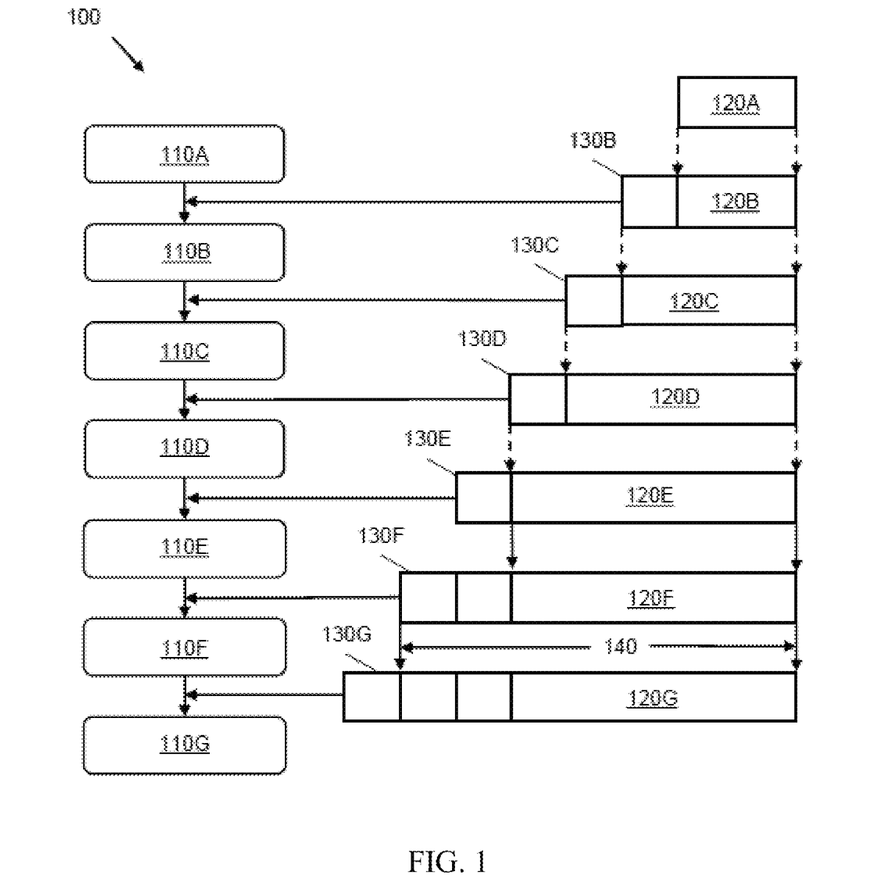
FIG. 1 shows a block diagram showing a model of network communication, according to an embodiment of the disclosure.

FIG. 1 is a schematic diagram that shows the Open Systems Interconnection (OSI) model 100 of communication, according to an example. The OSI model 100 defines seven layers 110A-110G that characterizes and standardizes the communication functions of telecommunication or computing system, without specifying the underlying protocols that are implement on the device.

The top most layer 110A is the Application Layer. The Application Layer 110A is closest to the user. The Application Layer 110A directly interfaces with software applications running on the user's computing device. In the Internet Protocol (IP) Suite the Application Layer 110A provides a set of protocols that include, for example, the Domain Name Suite (DNS) for assigning domain names, Simple Mail Transfer Protocol (SMTP) for e-mail support and File Transfer Protocol (FTP) for file transfer.

A data packet 120A of communication data from an application is provided at the Application Layer 110A. In FIG. 1 the data packet 120A is copied in the Application Layer 110A as the data packet copy 120B with an additional application layer header 130B. There is no formally defined "application layer header" 130B in the OSI model 100. Individual protocols and applications may add an application layer header 130B to the data packet 120A.

The Application Layer 110A passes the first data packet copy 120B to the Representation Layer 110B, the next layer in the OSI model 100. The data packet 120A in the Application Layer 110A may be presented in different data formats when it arrives in the Application Layer 110A from different sources. The Representation Layer 110B is responsible for formatting of the data packet copy 120B into a format which is useable by middleware applications lower down the network protocol stack.

The process of altering data into a format that is suitable for transmission is data serialization. In FIG. 1, the Representation Layer 110B adds a further serialization header 130C to the first data packet copy 120B. The first data packet copy 120B and header 130B become the second data packet copy 120C with serialization header 130C. The serialization header 130C includes data specifying how the data in the second data packet copy 120C has been serialized at the Representation Layer 110B.

The next layer is the Session Layer 110C. The Session Layer 110C provides protocols for management of a communications session between end-user application processes. Communication sessions consist of requests and responses that occur between applications. Protocols in the Session Layer 110C are used in application environments that make use of remote procedure calls.

The Session Layer 110C may include protocols to encrypt data, provide data authorization and authentication and checkpointing and recovery. Transport Layer Security (TLS) and Secure Socket Layer (SSL), are cryptographic protocols which are implemented to facilitate one or more of these facilities. The TLS/SSL protocols are examples of protocol which may be considered to be implemented in the Session Layer 110C, though these protocols do not generally fit in with the OSI model 100 as depicted in FIG. 1. TLS/SSL provide privacy and data integrity between two or more communicating applications.

The second data packet copy 120C and header 130C become the third data packet copy 120D with a further encryption header 130D. In the example shown in FIG. 1, the encryption header 130D specifies how the data of the third data packet copy 120D is encrypted.

The next layer of the OSI model depicted in FIG. 1 is the Transport Layer 110D. The transport layer provides end-to-end communication over a network. The Transport Layer 110D provides communication between application processes running on different hosts. The Transport Layer 110D is also responsible for the management of error correction. In FIG. 1, the third data packet copy 120D and the encryption header 130D is passed to the Transport Layer 110D. Data is packed into specific packets to form the data stream 120E. The Transport Layer 110D adds source and destination port numbers to the header 130E of the data stream 120E.

The Transmission Control Protocol (TCP) is a Transport Layer protocol in the IP suite. Another widely used protocol is the User Datagram Protocol (UDP) which provides port numbers for addressing at the source and destination of the data packet and checksums for data integrity.

The Network Layer 110E is provided below the Transport Layer 110D. The data stream 120E and Transport Layer header 130E are provided to the Network Layer 110E. The Network Layer 110E is the layer of the OSI model 100 that provides means of transferring variable-length data packets from a source to a destination host via a network. Protocols may be implemented in the Network Layer 110E to perform functions such as data packet forwarding, connection setup, data routing and delivery error reporting.

The Network Layer 110E responds to service requests from the Transport Layer 110D and issues service requests to the lower layers of the stack. In FIG. 1, the Network Layer 110E appends the data stream 120E including the Transport Layer header 130E with a further header 130F. In the context of the IP suite, the Network Layer 110D is similar to the internet layer which appends the data stream with an IP packet header. An IP packet header contains information such as the IP version, source IP address, destination IP address, time-to-live (TTL), header checksum, total packet length etc. The total data packet 120F including headers 130F, 130E comprises the IP datagram 140. In examples, the IP datagram 140 may comprise between 46 and 1500 bytes.

The Data Link Layer 110F is the lowest non-physical layer in the OSI model 100. The Data Link Layer 110F provides the functional and procedural means to transfer data between network entities. An example of a protocol that is implemented at the Data Link Layer is the Point-to-Point Protocol (PPP) which may be used to establish a direct connection between two network nodes. The data stream and headers 120F are passed to the Data Link Layer 110F. Data Link Layer 110F protocols may append the data stream with Ethernet header data 130G which contains media access control (MAC) address.

The final, lowest layer of the OSI model 100 is the Physical Layer 110G. The Physical Layer 110G consists of the electronic circuit transmission technologies of a network. It may be implemented through a wide variety of hardware technologies with different characteristics. A Physical Layer Chip (PLC) connects a link layer device to a physical medium such as a fibre optic cable which connects the computing device to the network.

Protocols at each layer of the OSI model 100 shown in FIG. 1 perform data manipulation operations. These data manipulation operations include copying communication data into and out of communication buffers, serialization, deserialization, data conversion operations and matching of data structures between applications and the communication middleware.

There are a number of optimizations to mitigate the effect on performance of data operations. For example, Direct Memory Access (DMA) allows data to be accessed directly from the kernel memory. It is more efficient for a network device to be able to access the data in this way as it avoids data having to be copied between the user space, where application data is written, and the kernel space where further data operations are performed on the data.

The methods and systems described herein further reduce the data manipulation operations inside user space, by realising a data pass-through from the application layer 110A to the lower layers of the network protocol stack in FIG. 1.

Figure 2:
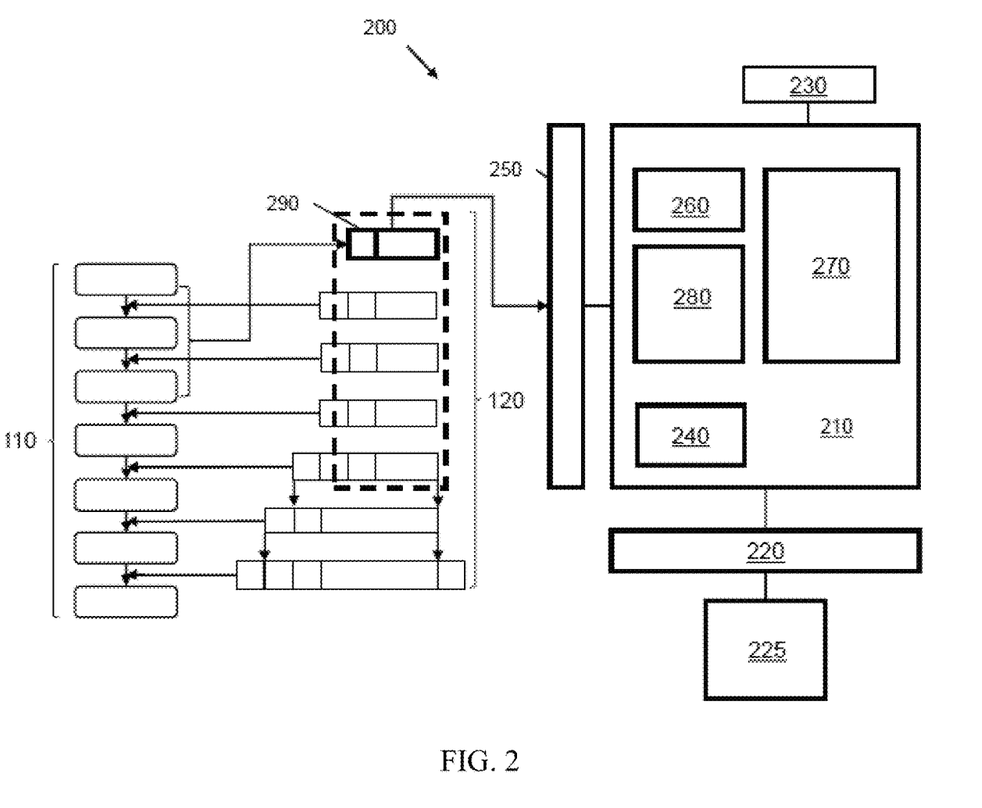
FIG. 2 shows a block diagram of apparatus in a communication system, according to an embodiment of the disclosure.

FIG. 2 is a block diagram showing a communication system 200, according to an example. The communication system 200 may be implemented in any networked computing device. The communication system 200 comprises communication middleware 210. The communication middleware 210 comprises modules to execute communication with other networked devices and other processes on the computing device. The communication middleware 210 is arranged to manage the flow of communication data through a network protocol stack, according to the OSI model 100 shown in FIG. 1. The layers 110 of the OSI model are shown in FIG. 2, corresponding to layers 110A-110G shown in FIG. 1. The data packet 120A and its copies 120B-120G of communication data is also shown in FIG. 2.

The communication middleware 210 is communicatively coupled to a communication channel 220. In the OSI model 100 shown in FIG. 1, the communication channel 220 implements protocols at the network layer 110E and below, down to the physical layer 110G. The communication channel 220 connects the computing device implementing the communication system 200 to other devices.

In FIG. 2, the communication channel 220 connects the communication middleware 210 with communication peer 225. The communication peer 225 may be another process or application which is implemented on the same computing device that implemented the communication system 200. In other cases, the communication peer 225 is a networked device that is in communication with the communication system 200 over a network.

The communication middleware 210 is communicatively coupled to an application 230. At a high level, the application 230 interacts with the communication middleware 210 to send and receive communication data using the communication channel 220. According to examples, the application 220 interacts with the communication middleware 210 via an application program interface (API). The communication middleware API manages the interfacing between the communication middleware 210 and higher-level software applications running on the computing device. The protocols executed by the communication middleware API, constitute the application layer 110A in the OSI model 100 shown in FIG. 2. The API may provide functionality that allows the application 220 to read and write communication data from or into memory and interact with the application layer 110A. The communication middleware API may add header information to communication data that are written into memory on the device. This corresponds to the application header 130B, shown in FIG. 1.

The communication middleware 210 comprises a protocol stack module 240. The protocol stack module 240 is arranged to implement protocols in the network protocol stack that correspond to layers 110A to 110D, according to the OSI model 100 shown in FIG. 1. This may include serialization and encryption protocols such as those described in relation to the Representation Layer 110B and Session Layer 110C in FIG. 1. In some cases, the protocol stack may also implement protocols at the network layer 110E and/or the data link layer 110F. The protocol stack module 240 is communicatively coupled to the communication channel 220. Communication data is passed to and from the communication channel 220 from the protocol stack module 240, for communication across the network with devices 230A and 230B.

The communication middleware 210 is communicatively coupled to a shared memory region 250. The shared memory region 250 is accessible to the application 230. Communication data that is sent to the communication middleware 210 from the application 230 is stored in the shared memory region 250.

The communication middleware 210 comprises a shared memory management module 260 which manages the data in the shared memory region 250. The shared memory management module 260 is responsive to requests by the application 230 to allocate memory in the shared memory region 250. In examples, the shared memory region 250 is a region of contiguous virtual memory in the user space, which is mapped in the system kernel as some physical memory, which may or may not be contiguous.

The communication middleware 210 further comprises data management module 270. The data management module 270 comprises logic for controlling how the communication data from the application 230 are managed and stored according to a specific format. The specific data format is a data format which is compatible for the Application Layer 110A through to the Transport Layer 110D. According to examples, the data format may specify that the communication data is stored in serialized and encrypted formats which are compatible with the protocols in the network protocol stack.

According to examples described herein, the communication middleware 210 comprises a communication regulator module 280. The communication regulator module 280 is communicatively coupled to the shared memory management module 260, protocol stack module 240, and data management module 270.

The communication regulator module 280 is arranged to integrate and regulate the original network protocol stack logic for the protocol stack for layers 110A to 110D. In particular, the communication regulator module 280 works in conjunction with the data management module 270, which defines the format in which communication data is stored in the shared memory region 250, to implement a data pass-through for communication data generated by the application 230. The data management module 270, which receives communication data from the application 230, includes a format header 290 on the original data packet 120A which forms the communication data. The format header 290 includes parameter data relating to how the data is stored in the shared memory region 250, such as the size of the allocated shared memory in the shared memory region 250.

The data management module 270 interacts with the shared memory management module 260 to store the data packet 120A in a Transport Layer-compatible data format in the shared memory region 250. This includes, for example, storing the data with the correct serialization and encryption formats for the Session Layer 110C and Transport Layer 110D. Information relating to data serialization and encryption is included in the format header 290.

The communication regulator module 280 is arranged to modify the header 130B to include the index of the data packet 120A from the shared memory. The communication regulator module 280 passes the application layer header 110B to the protocol stack module 240. The communication regulator module 280 comprises logic to ensure that the body of the data packet 120A that is stored in the shared memory region 250, is decoupled from the application layer header 130B through layers 110A to 110D of the protocol stack. It further ensures that no additional serialization or encryption is performed on that data.

Once the application layer header 130B has been processed in the Transport Layer 110D, the body of the data packet 120A may be provided from the shared memory region 250. According to examples described herein, the data packet 120A may be retrieved from shared memory region 250 by parsing the application layer header and accessing the data packet 120A on the basis of the address index provided in the application layer header 130B.

If the communication peer 225 is on the same computing device, then an inter-process communication may be used for fast communication. The processed application layer header 130B is sent to the communication peer 225 via the communication channel 220. The receiving process running on the communication peer 225 parses the processed application layer header 130B and accesses the communication data in data packet 120A on the basis of the address index provided in the application layer header 130B, as described. The receiving process of the communication peer 225 parses the format header contained in the data packet 120A in order to correctly parse the body portion of the data contained in the data packet 120.

If the communication is with a communication peer 225 over a network then the process a different process is executed. The kernel driver of both the sending computing device and receiving communication peer 225 are able to access the data packet 120A based on the index inside the processed application header 130B. Prior to sending data across the network the communication data is retrieved from the shared memory region 250 by the communication regulator module 280.

The communication data comprising data packet 120A and the processed application header 130B are communicated across the network. The communication peer 225 receives the processed application header 130B and data packet 120A, and saves the data packet 120A into a corresponding shared memory region of their device. The communication peer 225 parses the format header contained in the data packet 120A in order to correctly parse the body portion of the data contained in the data packet 120. If the byte order of the sender and receiver machines are different, then the receiver converts the data to its own byte order. The byte order is determined when the data packet arrives on the communication peer 225.

Figure 3:
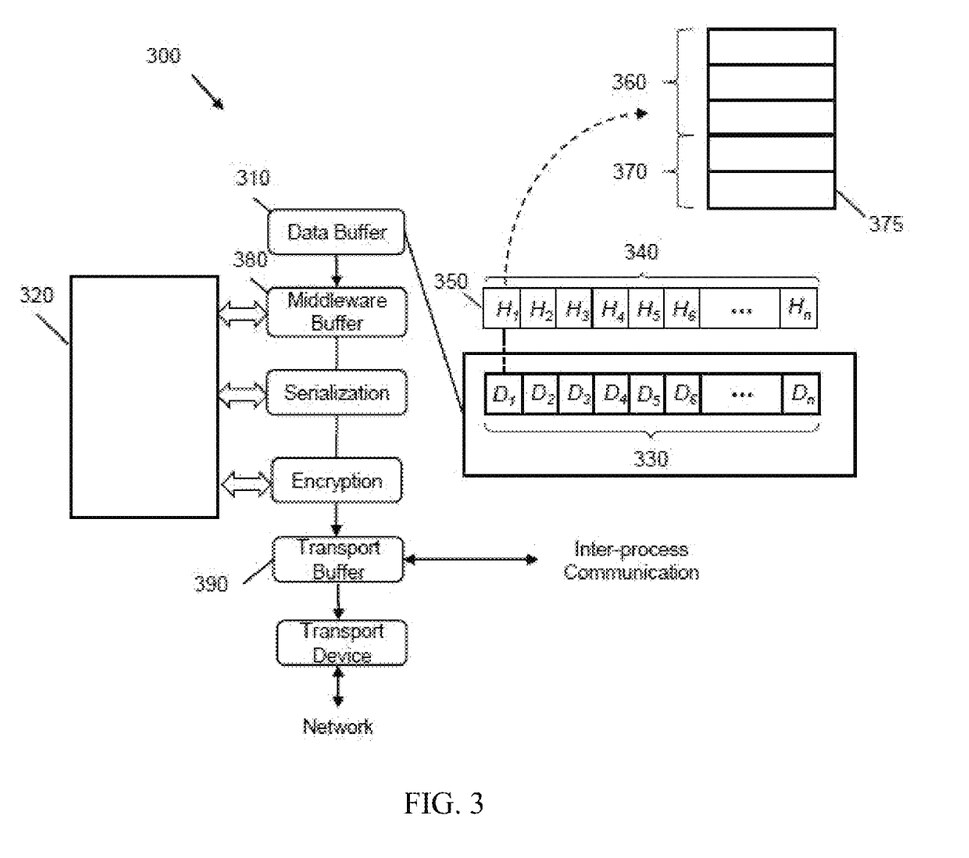
FIG. 3 shows a simplified schematic diagram of a protocol stack, according to an embodiment of the disclosure.

FIG. 3 is a schematic diagram showing a communication regulator module and shared memory region 300 according to an example embodiment of the disclosure. In FIG. 3, there is a shown a data buffer region 310. The data buffer region 310 may be part of shared memory region 250 shown in FIG. 2. Communication data from the application 230 is written in to the data buffer 310.

In the original workflow, communication data is written through each layer of the communication middleware. This involves multiple data copy and read/write operations to memory. In FIG. 3, there is shown a communication regulator module 320 similar to the communication regulator module 280 shown in FIG. 2. The communication regulator module 320 is arranged to reduce the number of these data operations by performing a data pass through for the body of the communication data.

The communication regulator module 320 stores communication data in data packets 330 labelled $D_1, D_2, D_3, \ldots, D_n$ in the data buffer 310. Each data packet 330 has a corresponding application headers 340 $H_1, H_2, H_3, \ldots, H_n$, similar to the application headers 130 shown in FIGS. 1 and 2.

The application header $H_1$ 350 is shown in detail in FIG. 3. The application header 350 comprises a middleware protocol header 360. The middleware protocol header 360 may comprise an identifier and additional data fields specifying further additional options relating to middleware protocols.

The communication regulator module 320 is arranged to modify the application header 350 with the modified header portion 370. The modified header portion comprises an index 375 specifying the location of the data packet in the shared memory region.

In the usual workflow, data that is stored in the user data buffer region 310 is copied into a middleware send/receive buffer 380. The communication regulator module 320 is communicatively coupled to the middleware send/receive buffer 380. The communication regulator module 320 ensures that the body of the communication data is decoupled from the application header 350 in the entire communication stack. The communication regulator 320 ensures that the body of the communication data is stored in the correct format with serialization and encryption, by communicating with the data management module as depicted, in FIG. 2.

The communication regulator 320 is arranged to ensure that no additional serialization and encryption operations are performed. In some examples, the communication regulator module is arranged to perform additional functions, such as Quality of Service (QoS) checks, filtering, flow control and E2E based on the modified header portion 350.

In FIG. 3, when the header 350 is processed in the transport layer, the body of the communication data is directly provided from the shared memory region (data buffer 310) and written into a transport buffer 390 for communication.

As previously described in relation to communication peer 225, if the communication peers are on the same machine, then Inter-Process Communication (IPC) may be used for fast communication. Data can be copied once to the transport buffer that is accessible to the receiving process. In another example a "zero-copy" may also be possible where the body of the communication data can be received from the same region of memory.

In the case where the communication peer is a different device that is connected to the same network, the body portion of the communication data is accessed on the basis of the address data of the modified header portion 350. The modified header 350 and body of the communication data are transferred together to the kernel driver of the receiving device. The modified header is parsed in the transport layer of the receiving device and the body portion of the communication data is accessed according to the address in the modified header portion.

Figure 4:
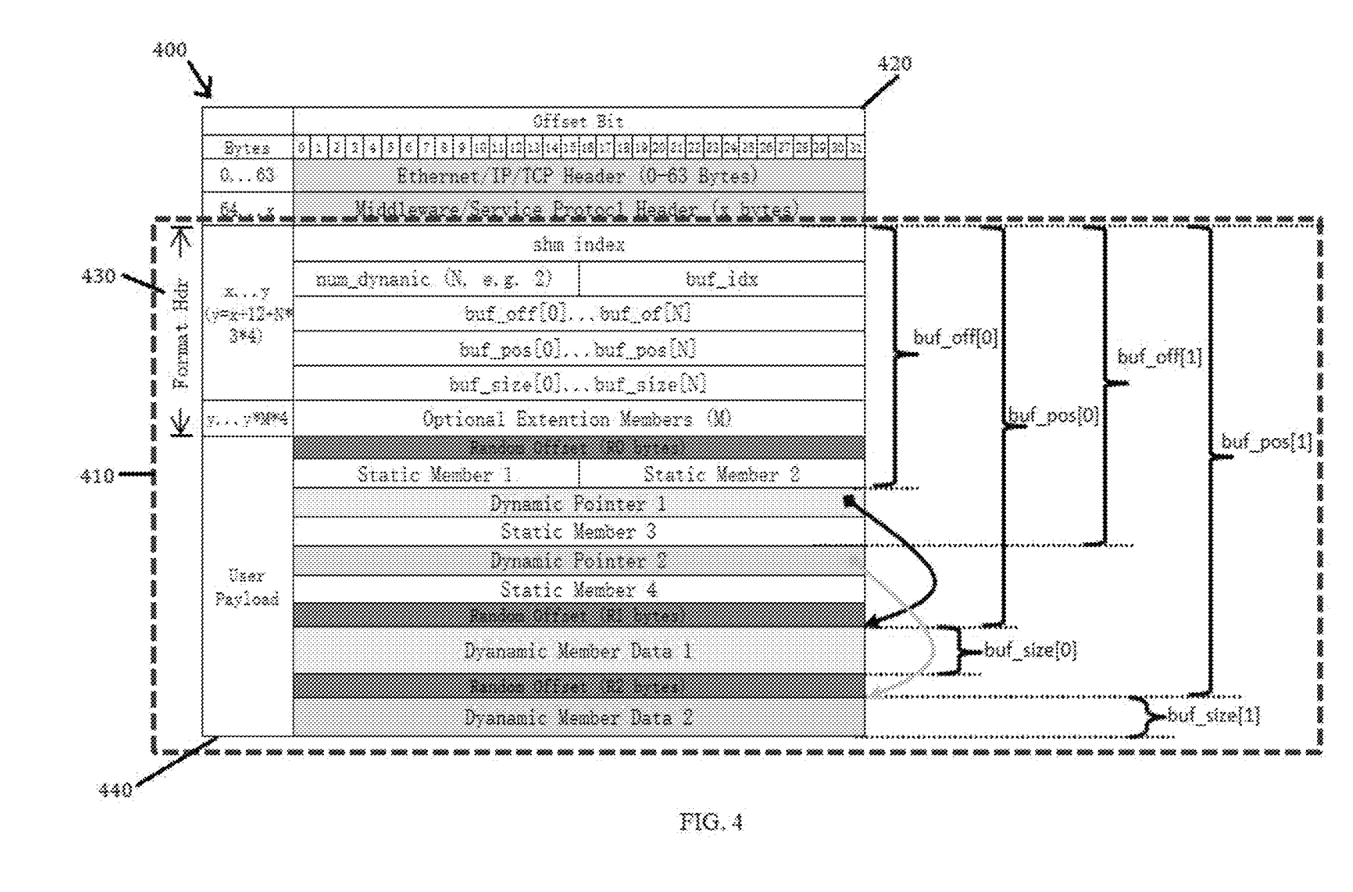
FIG. 4 shows a simplified schematic diagram of a data packet, according to an embodiment of the disclosure.

FIG. 4 is a simplified schematic diagram showing a data packet 400 of communication data according to an example embodiment of the disclosure. The data packet comprises a data packet body 410 and application header 420. The data packet body 410 comprises a format header 430 and a user payload 440. The format header 430 is attached to the body portion 410 of the data packet, by the data management module 270, which receives data packets from the application 230.

The data management module 270 provides the core data format definition that is compatible for the Application Layer 110A to the Transport Layer 110D, and a logic of how data packets are managed according to this format. The application 230 calls an initialization interface provided by the communication middleware to allocate the data buffer in the shared memory module 250, which is provided internally via a shared memory address.

In FIG. 4, number N of dynamic pointers num_dynamic is determined in the format header 430. The format header 430 contains following information:

shm_idx: An index to the shared memory data
num_dynamic: the number of dynamic pointers in the data packet
buf_index: the number of the dynamic pointer that have been allocated, which is less than or equal to N
buf_off[N]: the offset between the dynamic pointer and the beginning address of the header
buf_pos[N]: the offset between the allocated shared memory address and the beginning of the header
buf_size[N]: the size of the allocated shared memory The format header 430 can also be extended with encryption related data. For example, in some cases, the format header 430 comprises a random offset for each dynamic pointer. A random offset may be used to thwart attacks over the network. The format header 430 can also be extended for the advanced features like QoS, filter, query, history etc.

Figure 5:
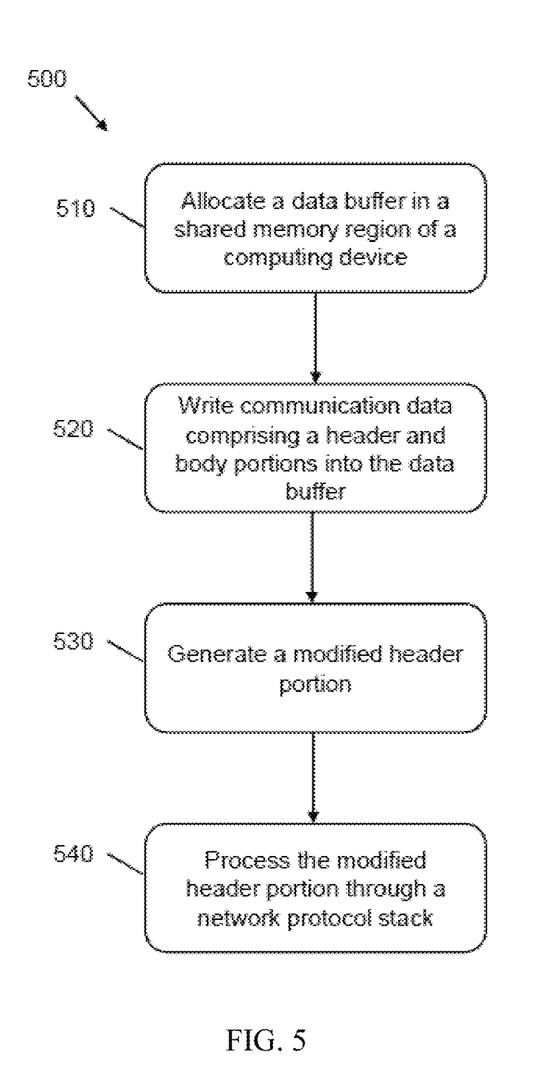
FIG. 5 shows a flow chart of a method of processing data in a network, according to an embodiment of the disclosure.

FIG. 5 is a block diagram showing a method 500 for processing data in a network protocol stack according to an example embodiment of the disclosure. The method 500 may be used in conjunction with the other methods and systems described herein. In particular, the method 500 shown in FIG. 5 may be implemented on the communication system 200 shown in FIG. 2 and communication regulator and shared memory shown in FIG. 3.

At block 510, the method comprises allocating a data buffer in a shared memory region of a computing device. According to examples, allocating a data buffer in a shared memory region comprises initialising a data buffer in the shared memory region and reserving the address space for the data buffer in the shared memory. When the method 500 is implemented on the system shown in FIG. 2, block 510 may be implemented using the communication middleware 210 with which the application 230 interacts.

At block 520, communication data comprising a header and body portions is written into the data buffer. According to examples described herein, the body portion of the communication data is stored in the data buffer in a compatible format for communicating the data in the networking protocol stack. Block 520 may be implemented by the communication middleware API that acts as an interface between the application 230, the shared memory region 250 and the data management module 270. In FIG. 2, the data management module 270 comprises logic for controlling how the data from the application 230 is managed and stored according to the compatible format. An example of the format was shown in FIG. 4. In the example of the body of the data packet shown in FIG. 4, a format header 410 was added on to the body portion. In some examples, block 510 includes a step of serializing and/or encrypting data to store the data in the compatible format.

At block 530, a modified header portion is generated. The modified header portion comprises the original header portion from the Application Layer 110A, and a further portion which comprises address data. The address data determines an address of the communication data in the data buffer. Block 530 is implemented by the communication regulator module 280. In examples, the communication regulator module 280 reads the address data which specifies the location of the communication data in memory and appends the header portion with the address data. In some cases, the modified header portion comprises a flag bit. This flag bit identifies the header portion as a modified header portion, which includes the further address data portion. This is used to identify the type of data that is being transmitted over the network to communication peers.

At block 540, the modified header portion is processed through a network protocol stack. According to examples described herein, block 540 is implemented by the communication regulator module 280. As described in relation to FIG. 2, the header is decoupled from the body portion of the communication data which has already been stored in a transmission compatible format by the data management module 270. The modified header portion is passed through the protocol stack to the lower layers according to the OSI model 100.

When the method 500 is implemented on the system shown in FIG. 2, the communication regulator module 280 ensures that the header portion of the communication data is passed through the stack, without further data operations being performed, beyond appending the original header portion with the address data. In particular, no additional memory copy functions are performed and no additional encryption or serialization operations are performed. In some examples, processing the modified header portion through the network protocol stack comprises determining that the body portion of the communication data is decoupled from the header portion.

According to examples, the method 500 may further comprise, parsing the modified header portion to determine the address data and accessing the body portion of the communication data on the basis of the address data of the modified header portion. This may be implemented by the communication regulator module 280. The communication regulator module 280 may use the address data of the modified header portion to retrieve the body portion, for communication either to a communication peer on the network, or another process on the same computing device. The body portion may be retrieved prior to responding to any service requests from lower layers in the network protocol stack such as the Network Layer 110E or Data Link Layer 110F.

Figure 6:
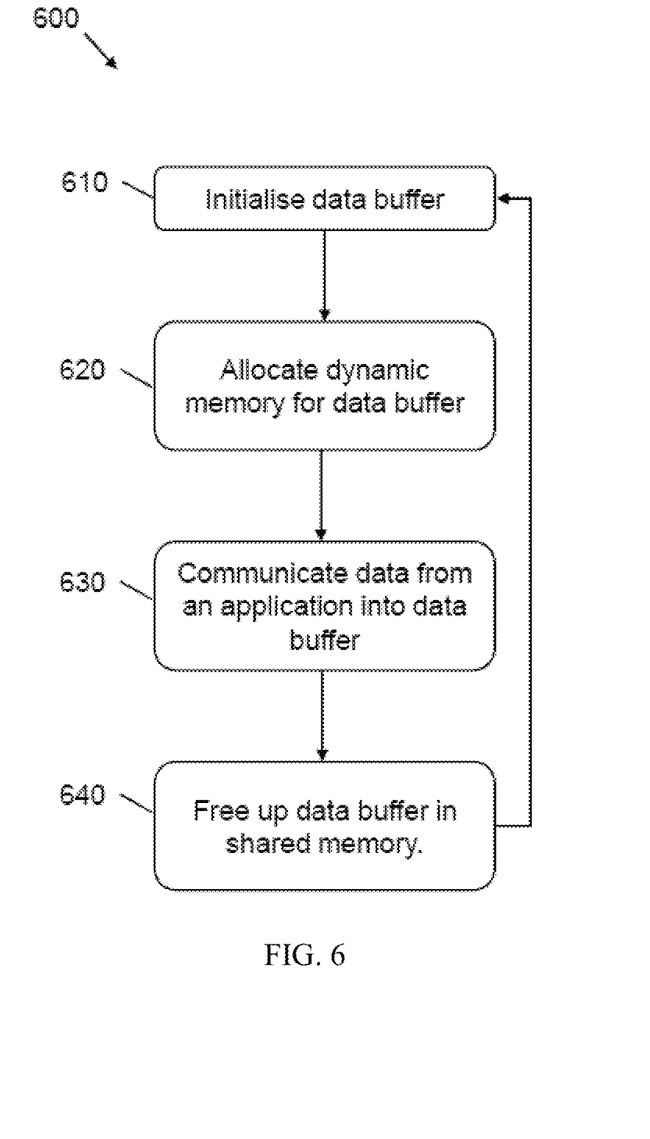
FIG. 6 shows a flow chart of a method of allocating storage in a communications device, according to an embodiment of the disclosure.

FIG. 6 is a block diagram showing a method 600 for writing data into a data buffer according to an example embodiment of the disclosure. The method 600 shown in FIG. 6 may be used in conjunction with the other methods and systems described herein. In particular the method 600 may be used in conjunction with the communication middleware 210 shown in FIG. 2, and also with communication peers 225 shown in FIG. 2. The method 600 may be implemented by the shared memory management module 260, which manages the shared memory 250.

At block 610 a new buffer is initialised. When the method 600 is implemented on the communication middleware 210, initialising a new data buffer according to the present disclosure, comprises communicating with the data management module 270, to ensure that data will be stored in the data buffer according to the correct data format.

At block 620, dynamic memory is allocated in the new data buffer. Any dynamic member of the data structures for the communication data from application 230, are allocated via an allocation interface which may be provided in the communication middleware API and implemented in the shared memory management module 260.

At block 630, data is communicated from an application. According to examples, the application 230, sends the data using the same communication middleware interface, as would usually be provided, however, when used in conjunction with the method 500 shown in FIG. 5, only the header is processed through the entire communication stack as provided for in the protocol stack module 240. The header includes a buffer index, specifying address data.

At block 640, once the communication data held in the data buffer has been either communicated over the network, or passed out of the data buffer, the allocation of the data buffer is released. According to examples described herein, synchronization may be performed between the communication middleware 210 and the reading device which is receiving the communication data. This ensures that the data buffer is only freed up when the communication data that was previously stored in the data buffer has been received. In some examples, the method 600 returns to block 610 once the data buffer has been freed.

Figure 7:
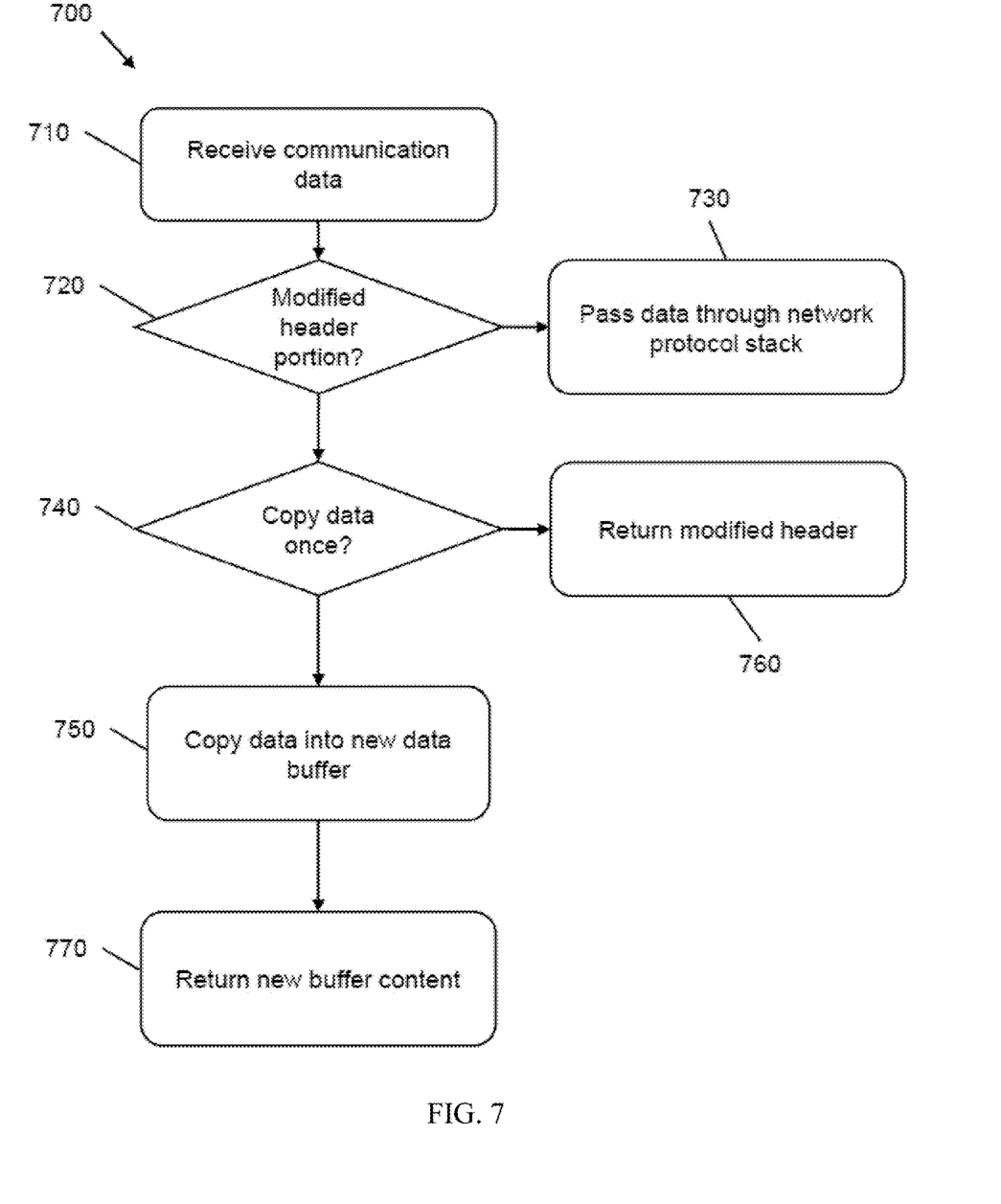
FIG. 7 shows a flow chart of a method for receiving data in a network, according to an embodiment of the disclosure.

FIG. 7 is a block diagram showing a method 700 according to an example embodiment of the disclosure. The method 700 may be used in conjunction with the systems described herein. In particular, the method 700 may be used at the corresponding shared memory management module of the communication peer 225 when receiving communication data from the communication system shown in FIG. 2.

At block 710 communication data is received from a computing device. In examples, the computing device that receives the data may be the same as the device that sent the data in the case of inter-process communication. In other examples, the data is communicated from a different computing device that is in communication over a network.

At block 720 it is determined whether the data that is received is data that has a modified header according to the methods described herein or whether the data is normal communications data. According to examples described herein, the determination may be made on the basis of a flag bit in the data packets indicating that has a modified header portion.

If the data is normal communication data then, at block 730, the data is passed through the network protocol stack.

At block 740, if it is determined that the data is communication data comprising a modified header portion, then the header is parsed to determine whether a single copy of the data should be made to be read in the communication protocol stack or whether zero copy is possible. Zero copy is a feature that allows data to be read more efficiently in networking protocols by eliminating the requirement to copy data between regions of memory to perform operations. In the present case the copy once feature allows a one-time copy. A one-time copy reduces the risk of data conflict and improves the efficiency when there are multiple data reading entities reading the same data. If the data is to be copied once then the data is written to a new buffer at block 750.

The buffer is returned to the user application, which is either the original received data pointer in the case of zero copy (block 760) or a newly created buffer in the case of one time-copy (block 770). For inter-process communication, when not using one time-copy, the application header is processed as is. For non-IPC communication, when one time-copy is used, the index of the shared memory is changed due to a new allocation, and the application header is updated with the new index.

Figure 8:
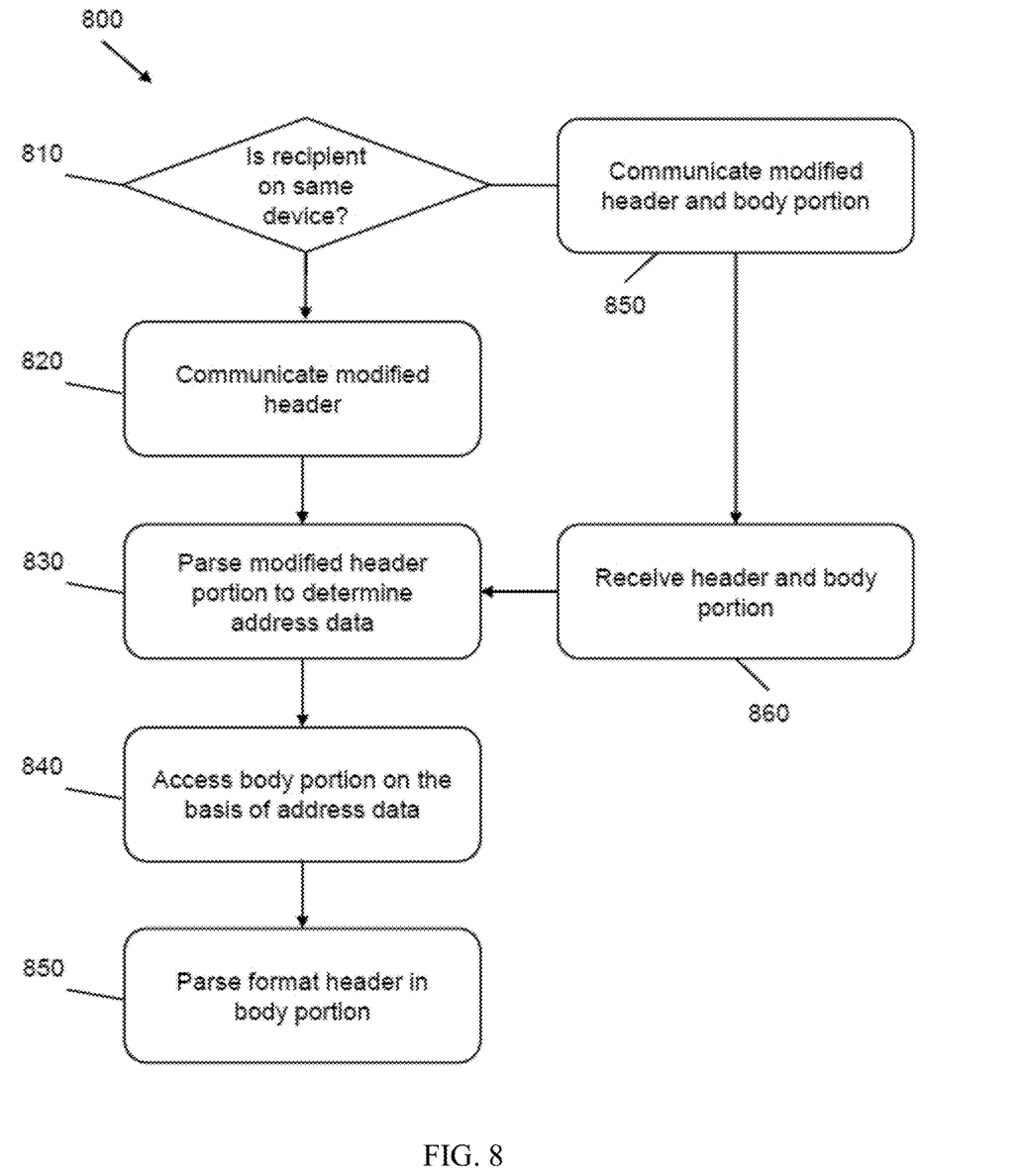
FIG. 8 shows a flow chart for communicating data in a network, according to an embodiment of the disclosure.

FIG. 8 is a block diagram showing a method 800, according to an example embodiment of the disclosure. The method 800 may be used in conjunction with the systems described herein. In particular, the method 800 is used between the communication system 200 and communication peer 225 when communicating data from the communication system comprising a modified header portion and body portion. The communication peer 225 may be a program running on the same machine or a device that is in communication with the communication system over a network.

At block 810 a determination is made if the recipient is on the same device. At block 820 if it is determined that the communication peer 225 is on the same device, then the modified header portion is communicated. At block 830, the modified header portion is parsed to determine the address data of the body portion in the shared memory on the same device. At block 840, the body portion is accessed on the basis of the address data and at block 850, the format header is parsed to correctly parse the payload of the body portion.

On the other hand, for communication with a recipient device over the network, the kernel driver of bother sender and receiver access the communication data based on the index inside the modified header portion of the communication data. At block 860, both the header and body portions are communicated through the network.

At block 860, the receiver receives the modified header portion and body portion and writes the data into shared memory on their device. An index update operation is initiated for the application due to the newly allocated shared memory. Blocks 830 to 850 are then replicated on the receiving device. That is, the receiving device parses the modified header portion to determine the address data, the body portion is accessed on the basis of the address data and the format header is parsed such that the payload of the body portion may be properly parsed.

The Distributed Data Service (DDS) standard defines the interface and behavior of data publication, transmission and subscription in a real time distributed system. It uses a language description service, and provides a platform independent data model, which is able to be mapped to other specific platforms and programming languages.

In DDS a producer application writes data using DataWriter and the data sample is sent over the DDS domain via a network. On the consumer side a data sample is read by the DataReader and then forwarded (copied) to the Consumer application.

In an implementation the methods and systems described herein on an open source implementation of DDS, reduced the communication from 2 milliseconds to 40 microseconds for 2 megabytes of data. The overhead inside the user space communication stack was reduced to 20 us.

In a further implementation the methods and systems were implemented in the Communication Management module in Adaptive AUTOSAR. Adaptive AUTOSAR is a standardization of the AUTOSAR run-time for Adaptive Applications (ARA). The standard contains two types of interfaces: services and APIs. The standard contains interfaces that are used in the development of future automotive Electronic Control Units (ECUs) running on multi-core microprocessors. These interfaces allow car manufacturers to implement autonomous driving, over-the-air software updates, Internet of Things features, media streaming and other services in future vehicles. The Adaptive platform allows dynamic linking of services and clients during ECU runtime.

The AUTOSAR architecture uses the original DDS interface for communication over a shared memory implementation, which contains two data copy operations in the serialization and de-serialization phases. Additionally, the binding layer has its own serialization functionality, which is used for translating the Adaptive AUTOSAR data type into a DDS sequence type and also involves one or two data copy operations due to use of temporary variables. In total, there are around four to six data copy operations for one communication operation.

In the optimized implementation using the methods described herein, the entire DDS protocol stack is completely zero copy enabled, and the number of data copy operations in the DDS binding layer was reduced to only two data copy operations for data serialization and data type conversion. The final performance reached about 3 milliseconds for 2 megabytes data communication in contrast to 12 milliseconds in the non-optimized version.

The methods and systems described herein provide an efficient data pass-through in a networking protocol stack. The payload of communication data that is to be transmitted over the network are stored in a transmission compatible format. This avoids the need for onerous and excessive memory-copy operations as the payload of the communication data does not need to be copied into memory through the layers of the protocol stack. The methods and systems described facilitate a single or even zero copy of the data prior to transmission across the network, or between processes on the same system. This results in an enhanced performance over other systems including a significant drop in latency.

The methods described herein are particularly suited to certain environments where a low latency is desirable. For example, communications systems in autonomous vehicles require low latency such that the vehicle may respond rapidly to changing circumstances. The methods and systems may be used to improve autonomous vehicle safety and responsiveness.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

Figure 9:
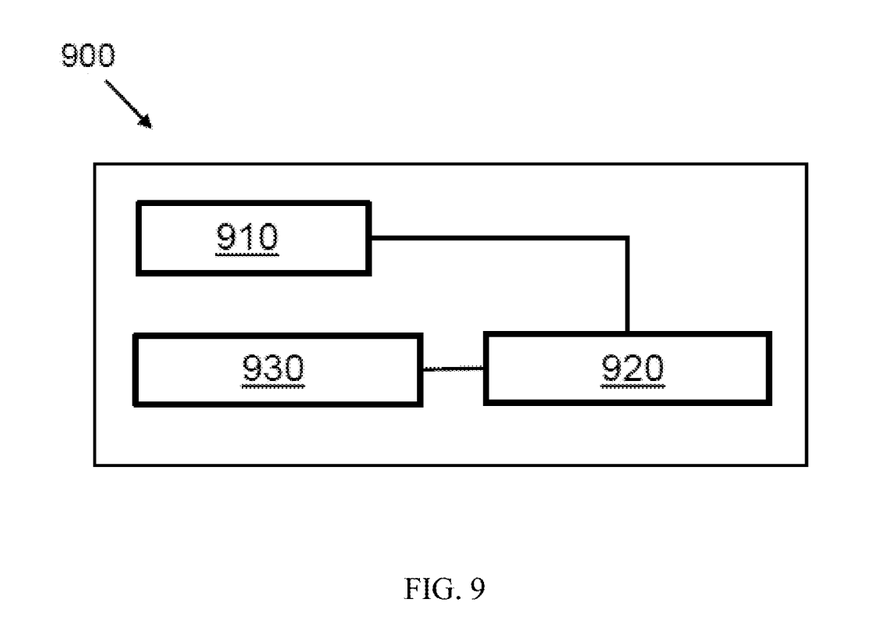
FIG. 9 shows a processor associated with a memory and comprising instructions for processing data in a network, according to an embodiment of the disclosure.

FIG. 9 shows an example of a processor 910 associated with a memory 920. The memory 920 comprises computer readable instructions 930 which are executable by the processor 910. The instructions 930 comprise instruction to, allocate a data buffer in a shared memory region of a computing device; write communication data comprising header and body portions into the data buffer; generate a modified header portion by appending the header portion of the communication data with address data that determines an address of the communication data in the data buffer; and process the modified header portion through a network protocol stack. The body portion of the communication data is stored in the data buffer in a compatible data format for communication according to the networking protocol stack.

It may be clearly understood by a person skilled in the art that, for the purpose of convenient and brief description, for a detailed working process of the foregoing system, apparatus, and unit, reference may be made to the corresponding process in the foregoing method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure may be implemented in the form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes: any medium that can store program codes, such as a universal serial bus (USB) flash drive, a removable hard disk, a read-only memory (ROM), a random-access memory (RAM), a magnetic disk, or an optical disc.

The present disclosure can be embodied in other specific apparatus and/or methods. The described embodiments are to be considered in all respects as illustrative and not restrictive. In particular, the scope of the disclosure is indicated by the appended claims rather than by the description and FIGs. herein. All changes that come within the meaning and range of equivalency of the claims are to be embraced within their scope.

What is claimed is:

1. A method comprising:
   allocating a data buffer in a shared memory region of a computing device;
   writing, into the data buffer in a compatible data format for communicating according to a network protocol stack, communication data comprising a header portion and a body portion into the data buffer, wherein writing the communication data comprises serializing and/or encrypting the communication data in the compatible data format, and wherein the compatible data format is compatible for an application layer to a transport layer in an Open Systems Interconnection (OSI) model;
   generating a modified header portion by appending the header portion with address data that indicates an address of the communication data in the data buffer, wherein the modified header portion comprises a flag bit identifying the header portion as the modified header portion; and
   processing the modified header portion through the network protocol stack.

2. The method of claim 1, further comprising:
   parsing the modified header portion to determine the address data; and
   accessing the body portion based on the address data.

3. The method of claim 1, wherein processing the modified header portion comprises determining that the body portion is decoupled from the header portion.

4. The method of claim 1, wherein the header portion comprises a middleware protocol header.

5. The method of claim 1, wherein the modified header portion comprises an index specifying a location of data packets in the shared memory region.

6. The method of claim 1, further comprising performing quality of service (QoS) checks based on the modified header portion.

7. The method of claim 1, wherein the method is applied to an autonomous vehicle system.

8. The method of claim 1, wherein the body portion comprises a format header and a user payload.

9. The method of claim 8, further comprising parsing the format header to parse the user payload.

10. An apparatus comprising:
    a shared memory region;
    a communication regulator communicatively coupled to the shared memory region and configured to:
       allocate a data buffer in the shared memory region; and
       generate a modified header portion by appending a header portion of data, wherein the modified header portion comprises address data that determines a location of the data in the data buffer, and wherein the modified header portion comprises a flag bit identifying the header portion as the modified header portion; and
    a data management system communicatively coupled to the communication regulator and configured to store the data in the data buffer in a compatible data format for communication through a network protocol stack, wherein the data is serialized and/or encrypted in the shared memory region in the compatible data format, and wherein the compatible data format is compatible for an application layer through to a transport layer in an Open Systems Interconnection (OSI) model.

11. The apparatus of claim 10, further comprising an interface communicatively coupled to the communication regulator and data management system and configured to facilitate data communication with external applications.

12. The apparatus of claim 10, further comprising a protocol stack system communicatively coupled to the shared memory region and configured to implement the network protocol stack.

13. The apparatus of claim 10, further comprising a shared memory management system communicatively coupled to the shared memory region and configured to manage the data in the shared memory region.

14. The apparatus of claim 10, wherein the header portion comprises a middleware protocol header.

15. The apparatus of claim 10, wherein the modified header portion comprises an index specifying a location of data packets in the shared memory region.

16. The apparatus of claim 10, wherein the body portion comprises a format header and a user payload.

17. The apparatus of claim 16, wherein the communication regulator is further configured to parse the format header to parse the user payload.

18. A non-transitory computer readable storage medium comprising computer program product that comprises computer-executable instructions and that, when executed by a processor, cause an apparatus to:

allocate a data buffer in a shared memory region of the apparatus;

write, into the data buffer in a compatible data format for communicating according to a network protocol stack, communication data comprising a header portion and body portion into the data buffer, wherein in order to write the communication data, when executed by the processor, the computer instructions further cause the apparatus to serialize and/or encrypt the communication data in the compatible data format, and wherein the compatible data format is compatible for an application layer through to a transport layer in an Open Systems Interconnection (OSI) model;

generate a modified header portion by appending the header portion with address data that indicates an address of the communication data in the data buffer, wherein the modified header portion comprises a flag bit identifying the header portion as the modified header portion; and process the modified header portion through the network protocol stack.

19. The non-transitory computer readable storage medium of claim 18, wherein when executed by the processor, the computer-executable instructions further cause the apparatus to:

parse the modified header portion to determine the address data; and access the body portion based on the address data.

20. The non-transitory computer readable storage medium of claim 18, wherein when executed by the processor, the computer-executable instructions further cause the apparatus to process the modified header portion to determine that the body portion is decoupled from the header portion.

* * * * *